United States Patent [19]
Schmidt et al.

[11] Patent Number: 5,210,729
[45] Date of Patent: May 11, 1993

[54] COMPUTER DISK TRANSFER APPARATUS

[75] Inventors: Terence J. Schmidt, St. Paul; Robert L. Skubic, Chanhassen, both of Minn.

[73] Assignee: Rimage Corporation, Minneapolis, Minn.

[21] Appl. No.: 715,778

[22] Filed: Jun. 14, 1991

[51] Int. Cl.⁵ .............................................. G11B 17/22
[52] U.S. Cl. ........................................ 369/36; 369/38; 369/75.1; 360/98.05
[58] Field of Search ........................ 369/36, 38, 75.1; 360/98.05, 98.06, 98.07, 98.08

[56] References Cited
U.S. PATENT DOCUMENTS 4,654,732 3/1987 Mesher ............................. 360/98.05
4,813,838 3/1989 Santeusanio .................... 414/798.1

Primary Examiner—David P. Porta
Assistant Examiner—Don Wong
Attorney, Agent, or Firm—Palmatier, Sjoquist & Helget

[57] ABSTRACT

A computer disk transfer apparatus for automatically transferring computer diskettes in a stable and precise fashion from one diskette duplicating machine to a subsequent diskette duplicating machine. The apparatus includes a swing arm which is bridgeable at least partially across a bin connecting the machines to close off the bin and which is swingable from the bridging position to open the bin. The swing arm is positioned such that each of the diskettes is continuously engaged and stabilized from entry into the bin to exit from the bin.

14 Claims, 4 Drawing Sheets

U.S. Patent May 11, 1993 Sheet 1 of 4 5,210,729
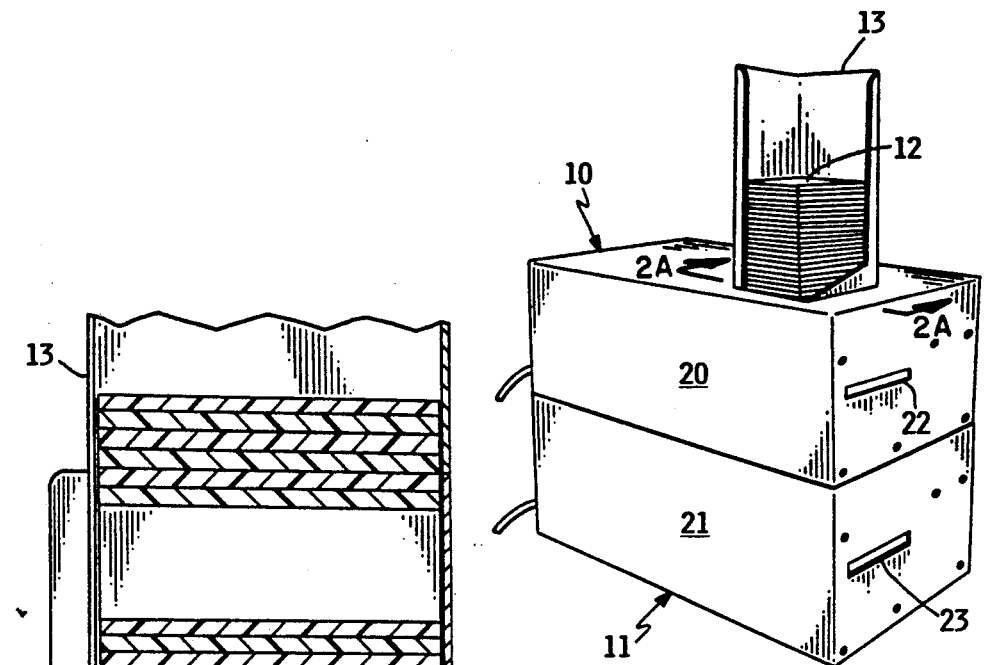
FIG. 1
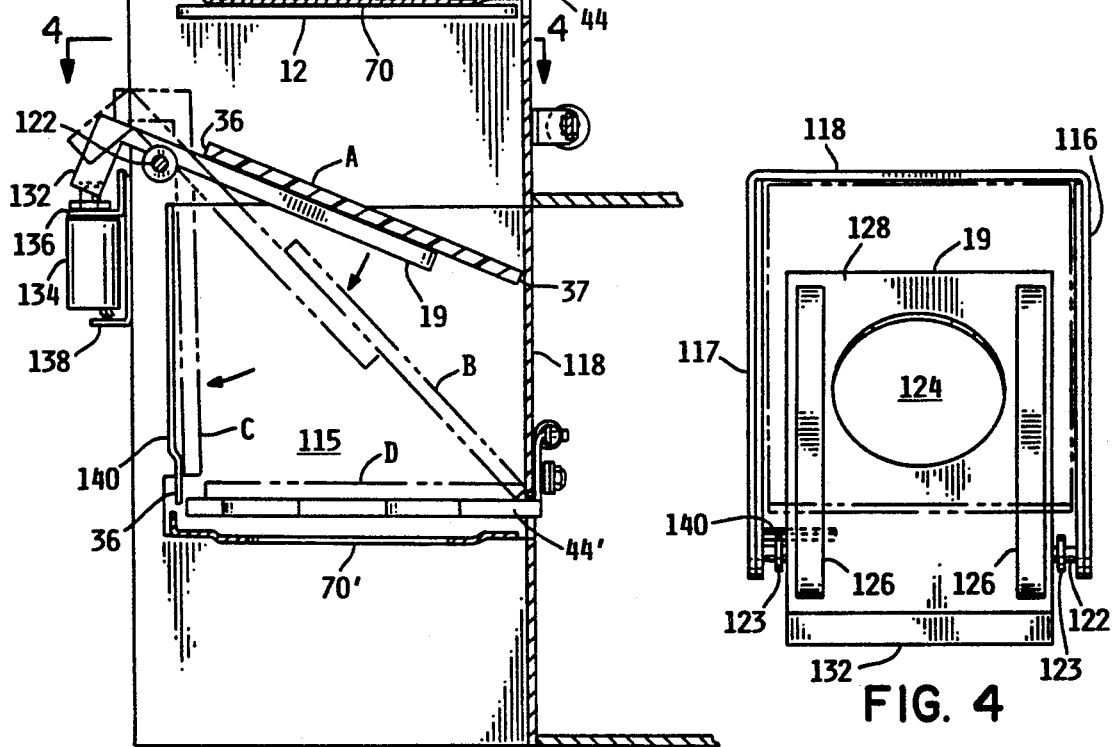
FIG. 3
FIG. 4

COMPUTER DISK TRANSFER APPARATUS

BACKGROUND OF THE INVENTION

This patent application hereby incorporates by reference my copending U.S. patent application Ser. No. 669,777, filed Mar. 15, 1991, entitled DISK LOADING SYSTEM.

The present invention relates to an apparatus for transferring disk-like objects between processing stations and, more particularly, to a computer disk transfer apparatus.

Computer disks may undergo a number of processing operations and require transportation from one processing operation to the subsequent processing station. For example, one processing station may include a first disk duplicating machine for copying certain information onto a disk. A subsequent station may include a second disk duplicating machine that verifies that such information was copied correctly by the first disk duplicating machine.

As a multitude of disks may be processed, it is of course preferable that the mode of transport for moving the disks from one processing station to the subsequent station be dependable. It may be economically inefficient when such a transfer mode breaks down even once for every 1,000 disks processed.

Furthermore, it is preferable that the disks so transported be precisely aligned for pickup by the second processing station. If one out of every 1,000 disks is misaligned after transported from the first disk duplicating machine, such a transport device may be economically unfeasible.

SUMMARY OF THE INVENTION

A feature of the present invention is the provision in an apparatus for transferring computer disks from one processing station to the next, of a bin with at least three wall-like means for retaining three edges of the computer disk and a swing arm for controlling the lower surface and fourth edge of the disk in the transfer operation.

Another feature is the provision in such an apparatus of the swing arm including a distal end for engaging one edge of the disk and a stop for engaging the opposing edge of the disk when the distal end lies at an altitude slightly above the stop to engage and stabilize the disk immediately prior to the disk being placed into position for forwarding to the next processing station.

Another feature is the provision in such an apparatus of the swing arm including a distal end which extends at least halfway across the distance to an opposing wall-like means.

Another feature is the provision in such an apparatus of the swing arm being oriented obliquely of an opposing wall-like means when in a bridging position such that the disk engages both an opposing wall-like means and the swing arm for stabilization.

Another feature is the provision in such an apparatus of the swing arm comprising a counterweight which is of sufficient mass to bias the swing arm toward a bridging position but which also allows the weight of the disk to force the swing arm downwardly from the bridging position.

Another feature is the provision in such an apparatus of a releasable connector means connectable to the swing arm for stabilizing the swing arm when the swing arm receives the impact from a disk falling through the inlet.

Another feature is the provision in such an apparatus of the releasable connector means including an electromagnet, solenoid, or motor.

An advantage of the present invention is the transfer of a computer disk to a precise location for pickup. One feature contributing to this advantage is the continual engagement of a disk until the disk has been transferred to an outlet for loading into the next processing station.

Another advantage is that the present invention is dependable and substantially maintenance-free. One feature contributing to this advantage is the minimum of moving parts.

Another advantage is that the present transfer apparatus is inexpensive and simple to install and operate.

Another advantage is that the present invention may be utilized for transferring a variety of computer disks including the 5¼ inch diameter floppy disk and the more rigid 3½ inch diameter diskette.

BRIEF DESCRIPTION OF THE DRAWINGS

FIG. 1 is an isometric view of a pair of upper and lower diskette duplicating machines with a hopper containing a plurality of diskettes to be copied in the upper machine and verified in the lower machine;

FIG. 3 is a section view at lines 3—3 of FIG. 2 showing various disk positions;

FIG. 4 is a section view at lines 4—4 of FIG. 3; and

DETAILED DESCRIPTION OF THE PREFERRED EMBODIMENT

Figure 2A:
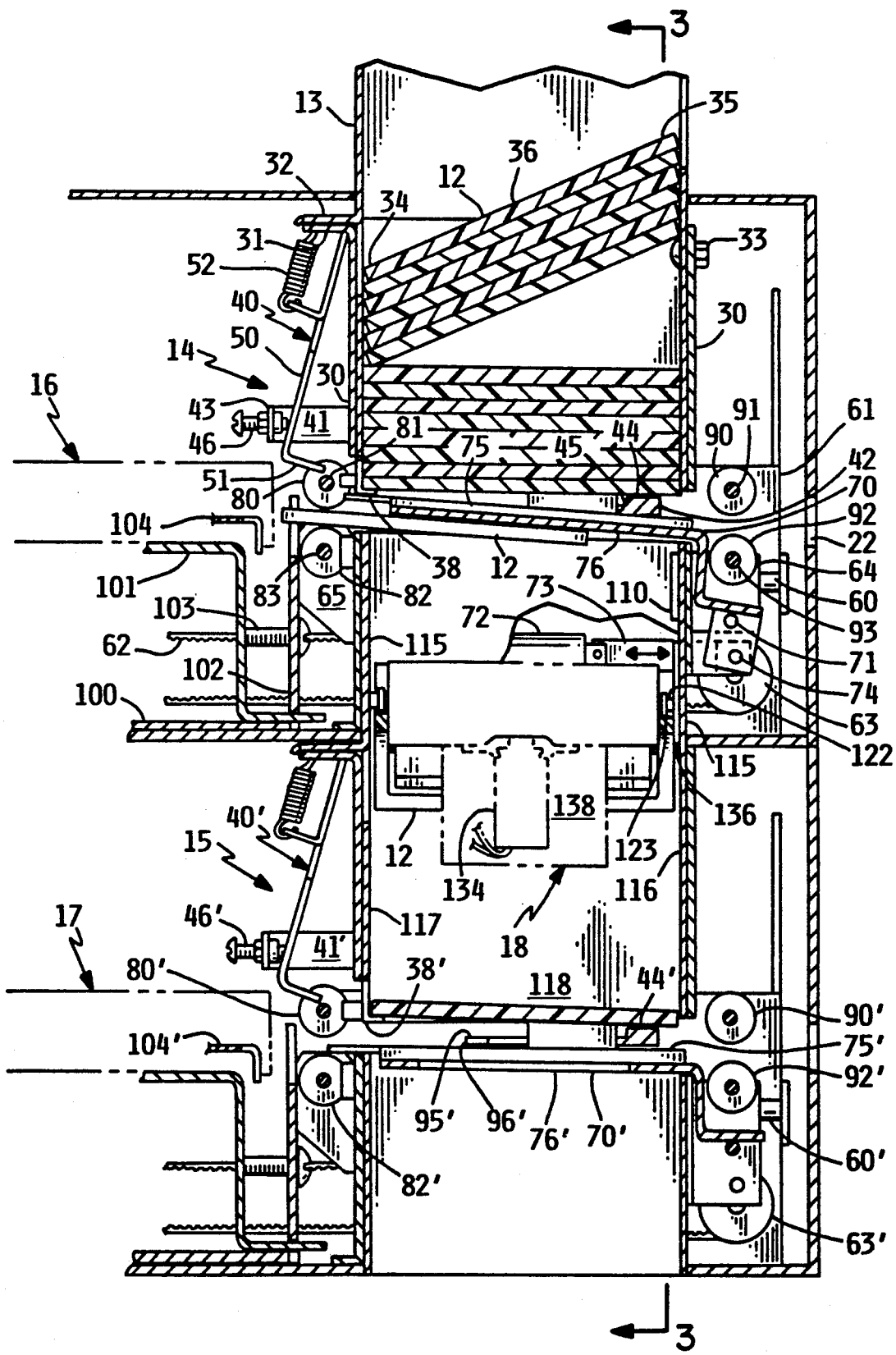
FIG. 2A is generally a section view at lines 2—2 of FIG. 1.

FIG. 1 shows a pair of upper and lower diskette duplicating machines 10 and 11. The upper diskette duplicating machine typically copies certain information onto each of the 3½ inch diameter diskettes 12 in stack loader or hopper 13. The diskettes 12 are transferred one by one to the lower diskette duplicating machine which verifies that the desired information was correctly copied. As shown in FIG. 2, each of the machines includes respective diskette control mechanisms 14, 15 for loading and unloading diskettes 12 from respective diskette drives 16, 17 for copying and verifying copied information, respectively. FIGS. 2 and 3 show a transport mechanism 18 with a swing arm 19 for transferring the diskettes from one machine 10 to the other machine 11.

As shown in FIG. 1, the diskette duplicating machines 10, 11 include respective housings 20, 21, in which are formed respective eject or exit slots 22, 23. Slot 22 of the upper machine 10 allows the machine 10 to eject diskettes 12 such as when the copied information is not to be verified or when it is determined that a diskette 12 is not suitable for copying. A copied and verified diskette 12, which is processed in diskette duplicating machine 11, is ejected through slot 23.

It should be noted that the diskette duplicating machines 10, 11 typically communicate with each other through a computerized means. Such communication may include the information being copied and verified and the interchange of various machine status signals.

Figure 2B:
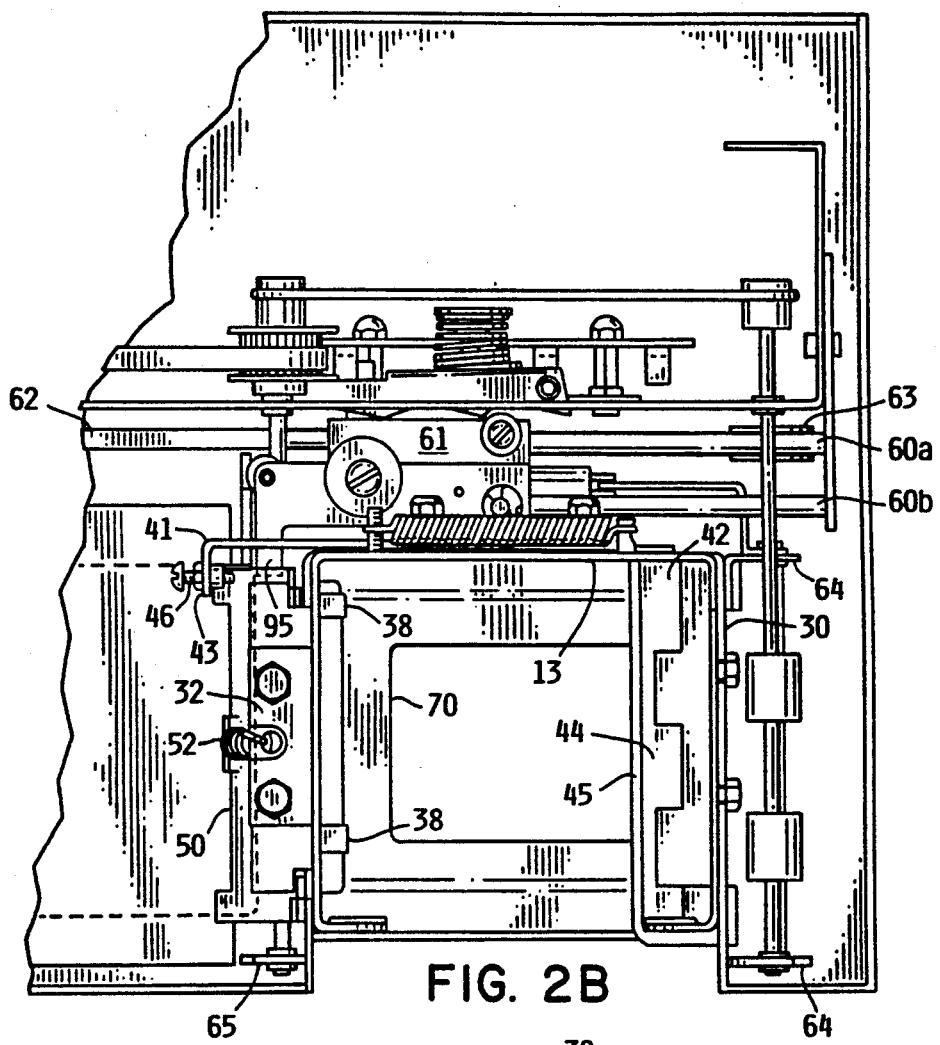
FIG. 2B is a top view of the hopper portion.
Figure 2C:
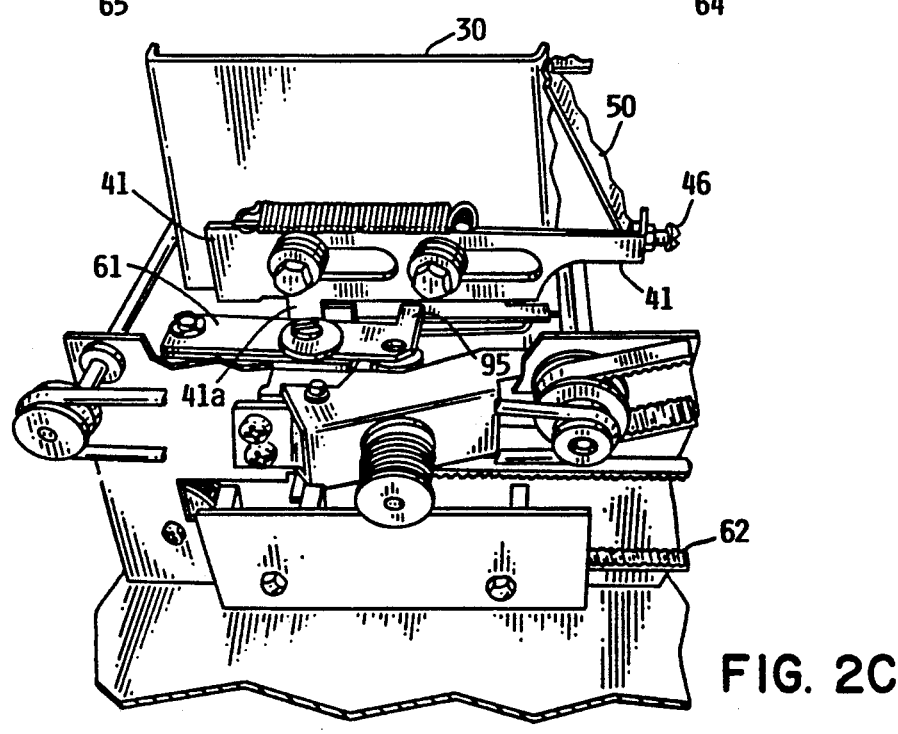
FIG. 2C is a rear isometric view of a hopper portion.

As shown in FIGS. 2A-2C, the loader mechanism 14 of machine 10 includes the hopper 13 which is mounted on the machine 10 via a generally U-shaped frame portion 30. A lip 31 of the frame portion 30 engages a lip 32 of the hopper 13 and a fastener 33 engages the frame portion 30 in the hopper 13 transversely of the lips 31, 32 to removably connect the hopper 13 to the machine 10. The hopper 13 engages a leading edge 34, a trailing edge 35, and lateral edges 36, 37 of each of the diskettes 12 to limit movement thereof. The hopper 13 includes a pair of lower tabs 38 to engage the leading edge 34 of the bottom diskette, which is next in line for loading into the diskette drive 16.

The loader mechanism 14 further includes a diskette removal mechanism 40 for removing the lowermost diskette from the hopper 13 for copying. The diskette removal mechanism 40 includes a bar 41 slidably mounted on the exterior of the hopper 30 and including two cooperating arms 42, 43. Arm 42 may be referred to as a slidable gate and includes an upper surface 44 foregaging the lower surface of the lowermost diskette 12 in cooperation with the tabs 38. Arm 42 also includes a right angled edge 45 to engage the trailing edge 35 of the lowermost diskette 12.

Arm 43 includes a screw 46 for engaging a swingable kicker plate 50 with kicker tabs 51 for pushing the lowermost diskette from out of engagement with tabs 38 of hopper 13. A coil spring 52 affixed between the plate 50 and the lip 31, 32 biases the kicker plate 50 to an unengaged position. When the bar 41 slides rearwardly, the screw 46 engages the plate 50. The distal ends of the tabs 51 then engage the leading edge 34 of the lowermost diskette. Simultaneously, arm 42 slides rearwardly and the trailing edge 35 of the lowermost diskette drops onto the right angled edge 45. The arm 42 and the diskette continues to slide rearwardly to allow the diskette leading edge 34 to be fully kicked out of engagement from the tabs 38.

The loading mechanism 14 also includes a linear slide 60 having two rails 60a, 60b. A carriage 61 rides on the linear slide 60 and engages a tab 41a on the arm 41, and moves the arm 41 rearwardly to remove the lowermost diskette from the hopper 13. The carriage 61 is driven on the linear slide 60 by a toothed drive belt 62 which is coupled to a toothed idler pulley 63. A pair of brackets 64 and a pair of brackets 65 are mounted on opposite sides of the hopper 30 to mount certain components.

One such component is a diskette tray or swingable gate 70 which participates in the loader mechanism 14 and which directs a copied diskette 12 exiting drive 16 either to the transfer mechanism 18 or through the slot 22. The gate 70 pivots on a pivotal rod 71 connected between the frame and bracket 64. The gate 70 is controlled by an electrically activated solenoid 72 which has an arm 73 engaging the gate 70 via a pivotal pin connector 74. The gate 70 further includes an upper surface 75 onto which the leading edge 34 of the lowermost diskette of the hopper 13 drops for loading into the diskette drive 16 and on which a copied diskette 12 slides when being discharged from machine 10 through slot 22. The gate 70 further includes a lower surface 76 which directs a copied diskette 12 into the transfer mechanism 18 when the gate 70 is swung upwardly as shown in FIG. 2A.

A pair of resilient rollers or diskette nippers 80 are affixed on a drive axle 81 for engaging diskettes 12 being driven into the diskettedrive 16 by arm 42. Axle 81 is affixed to and between the frame and one of the brackets 65. A pair of passive wheels or free-wheeling rollers or diskette nippers 82 mounted directly below wheels 80 on an axle 83 cooperate with wheels 80 to engage the diskettes 12 during entry into and exit from the diskette drive 16. Axle 83 is affixed to and between both brackets 65.

A pair of resilient rollers or diskette nippers 90 are affixed on a drive axle 91 for engaging diskettes 12 being discharged through slot 22 of machine 10. Axle 91 is affixed to and between the frame and one of the brackets 64. A pair of passive wheels or free-wheeling rollers or diskete nippers 92 mounted directly below wheels 90 on an axle 93 cooperate with wheels 90 to engage the diskettes being discharged through slot 22. Axle 93 is affixed to and between both brackets 64.

The carriage 61 riding on the linear slide 60 includes an arm or finger 95 with an edge for engaging the trailing edge 35 of the diskettes after such diskettes have been engaged by rollers 80, 82. The arm 95 is biased toward the frame such that it does not protrude into hopper 13 to engage the diskettes 12 until the diskettes 12 have been pulled at least partially into the diskette drive 16 by the rollers 80, 82. Arm 95 pushes the diskette into diskette drive 16.

Disk drive 16 includes fixed frame portions 100, 101. A swingable plate 102 swingable affixed at a bottom portion to plate 101 is normally biased toward and against the head of a fastener 103, which in turn is fixed to plate 101 and extends through an aperture in swingable plate 102. Plate 102 is engaged by the carriage 61 riding on the linear slide 60, which then pushes the plate 102 toward the diskette drive, triggering eject finger 104, which in turn initiates disengagement and ejection of the diskette in drive 16.

It should be noted that the loading mechanism 15 of machine 11 includes substantially the same features as the loading mechanism 14 on machine 10. The diskette drive 17 of machine 11 also includes substantially the same features as diskette drive 16. Such features of the loading mechanism 15 and diskette drive 17 are identified by the prime symbol (').

The transfer mechanism 18 includes a strip of tape 110 with a textured nonskid surface. The tape 110 is affixed to the interior of one side of the U-frame 30 for engaging the trailing edge 35 of each of the diskettes 12 after such diskettes have been ejected and the gate 70 is raised to transfer such diskettes to machine 11. The textured tape 110 minimizes slippage and movement of the diskettes and protects the frame 30 from wear from numerous diskette impacts.

Referring to FIGS. 3 and 4, the transfer mechanism 18 also includes a lower bin portion 115, which is integral with the U-frame 30, and into which the copied diskettes 12 fall after hitting the textured strip 110. The lower bin 115 includes three walls or wall-like or elongate retainer means 116, 117, 118. Walls 116, 117 lie transversely of each other and are spaced apart a distance approximately equal to or slightly larger than the distance between leading edge 34 and trailing edge 35 of the diskettes 12.

As shown by FIGS. 2A, 3 and 4, the transfer mechanism 18 also includes a swing arm 19 which is pivotally connected to and between walls 116 and 117 via a rod 122 having spacers 123 for spacing the swing arm 19 from walls 116, 117. The swing arm 19 includes a hole 124 for balancing the weight of swing arm 19 equally on either side of rod 122. A pair of plastic strips 126 having a low coefficient of friction are mounted on the swing arm 19 for allowing diskettes being transferred to readily slide along swing arm 19.

Swing arm 19 is counterbalanced about shaft 122, by the use of a counterweight 132 Counterweight 132 is sized so as to maintain swing arm 19 more or less balanced on shaft 122 with no load on the swing arm. An electromagnet 134 is positioned beneath counterweight 132, and electromagnet 134 may be selectively energized to exert a pulling force against counterweight 132 to hold swing arm 19 in a stable position, even with the loading of a diskette on swing arm 19.

The counterweight 132 and electromagnet 134 may be referred to as a control means. Such control means may include a permanent magnet or mechanical linkage, although these means are less preferable. The electromagnet 134 is affixed to a plate 136, which in turn is affixed to a frame piece 138 running between and integral with walls 116, 117. The bar 132 is attracted and adhered to the electromagnet 134 when the swing arm 19 receives the impact of a falling diskette 12.

The weight of the counterweight 132 is sufficiently great to swing the swing arm 19 upwardly to the diskette receiving position A, where the counterweight is held by the electromagnet 134. The weight of the counterweight 132 is sufficiently small to allow the swing arm 19 to swing downwardly under the weight of a diskette 12, when the electromagnet 134 is deenergized.

As shown in FIGS. 3 and 4, the transfer mechanism 18 further includes a wall-like stop 140 integral with and extending from wall 117 for engaging and confronting the swing arm 19 such that the swing arm is stopped in a vertical position. This may be referred to as the disk-discharging position C of the swing arm 19.

Figure 5:
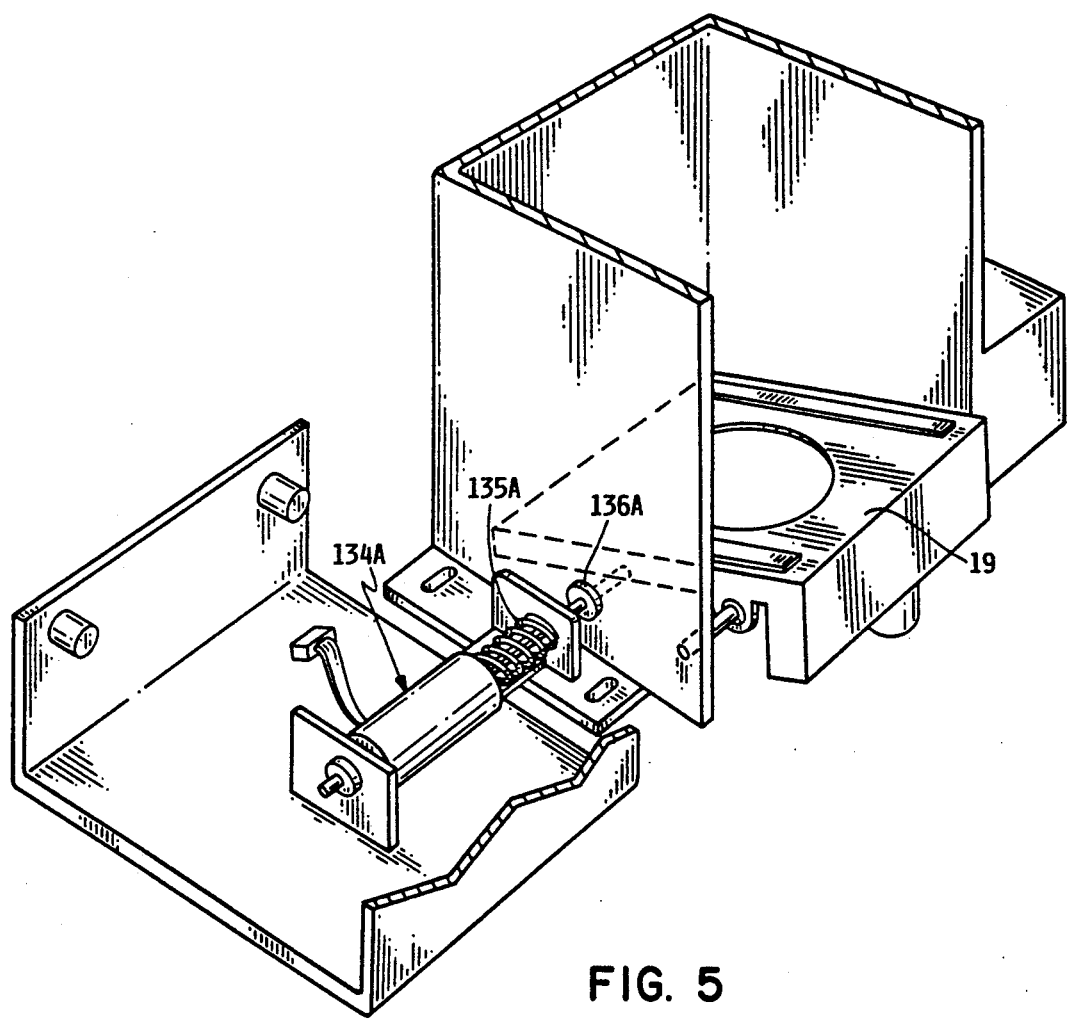
FIG. 5 shows an alternative embodiment of the swing arm mechanism.

FIG. 5 shows an alternative form, wherein a push-type solenoid 134A may be mounted in a different position relative to swing arm 19. In this embodiment, solenoid 134A has a solenoid arm which is biased inwardly by a spring 135A. Activation of solenoid 134 causes the solenoid arm to move outwardly, through an opening 136A; to engage under swing arm 19. Thus energized, solenoid 134A will hold swing arm 19 in an upper position and prevent it from tipping downwardly. Deenergization of solenoid 134A will retract the solenoid arm and permit swing arm 19 to pivot downwardly as described earlier.

In operation, a diskette is transferred from machine 10 to machine 11 after the diskette 12 has been copied in machine 10 and ejected into bin 115 by the gate 70. The ejected diskette engages the textured tape 110 and falls onto the strips 126 of the swing arm 19. Immediately prior to the diskette 12 engaging the swing arm 19, the electromagnet 134 holds the counterweight 132 to stabilize the swing arm 19 for receiving the impact of the falling diskette 12. After the falling diskette 12 engages the swing arm 19, the diskette 12 slides down the strips 126 such that its lateral edge 37 engages wall 118 of the bin 115 as identified by reference letter A in FIG. 3. After the lateral edge 37 has engaged the wall 118, the electromagnet 134 is turned off to release the counterweight 132 and the swing arm 19, which in turn pivots downwardly under the weight of the diskette 12. As the swing arm 19 moves downwardly, edge 37 continues to engage and slide against wall 118 for stabilization. Leading and trailing edges 34, 35 may also engage walls 117, 116, respectively, as the swing arm 19 swings downwardly. Subsequently, the lateral edge 37 engages the upper surface or stop 44' of arm 42' as identified by reference letter B. Accordingly, the diskette 12 and swing arm 19 begin to move out of a common plane with each other such that the other lateral edge 36 becomes generally the only portion of the diskette 12 engaging the swing arm 19. The lateral edge 36 then slides on the strips 126, then off the strips 126, then onto the distal end 128, and then off the distal end 128 and into a horizontal position to be engaged by tabs 38' for loading into diskette drive 17. Tabs 38' and the lower portions of wall-like means 116, 117, and 118, and the upper surface 44' of arm 42 define an outlet for the transfer mechanism 18 and for the horizontal diskette 12 as identified by reference character D. After the lateral edge 36 disengages from the distal end 128 of the swing arm 19, the swing arm 19 swings upwardly under the weight of counterweight 132 to adhere to and be stabilized by the electromagnet 134 for transferring the subsequent diskettes.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for transferring a disk from one station to another station, the disk comprising a first set of opposing edges, a second set of opposing edges, and a lower surface, the apparatus comprising:
   a) bin means disposed between the stations for minimizing side-to-side movement of the disks and comprising:
      1) an inlet adjacent one of the stations for receiving the disk;
      2) an outlet adjacent the other station for discharging the disk;
      3) a pair of first and second opposing elongate retainer means disposed between the inlet and outlet for engaging the first set of opposing edges of the disk to minimize movement of the disk in one direction; and
      4) a third elongate retainer means disposed between the inlet and outlet for engaging one edge of the second set of opposing edges of the disk; and
      5) a stop disposed adjacent to the outlet, for engaging against one of the edges of the disk;
   b) a swing arm pivotally mounted on the bin between the inlet and outlet and transversely of the third retainer means for engaging the lower surface and another edge of the second set of opposing edges of the disk to cooperate with the third elongate retainer means to minimize movement of the disk in another direction and to pivotally transfer the disk to the outlet, the swing arm being at least partially bridgeable between the opposing retainer means; and
   c) control means connectable to the swing arm for selectively stabilizing the swing arm against pivoting and for selectively allowing pivoting of the swing arm away from the third retainer means to open up the outlet; whereby the disk falls through the inlet to engage the swing arm which is pivoted downwardly while at least one of the edges of the disk slides against one of the retainer means to stabilize the disk, the disk engaging the stop and being pivotally transferred by the swing arm until the swing arm opens the outlet to permit the disk to disengage from the swing arm and fall into the outlet.

2. The apparatus according to claim 1, wherein the swing arm includes a distal end which lies at an elevation slightly above the stop when the swing arm opens the outlet such that the disk is engaged and stabilized by the swing arm until the disk is in the outlet.

3. The apparatus according to claim 1, wherein the swing arm includes a distal end which extends at least halfway to the third retainer means.

4. The apparatus according to claim 1, wherein the swing arm includes a distal end which terminates near the third retainer means.

5. The apparatus according to claim 1, wherein the swing arm is oriented obliquely of the third retainer means such that the disk readily slides on the swing arm to engage the third retainer means for being stabilized.

6. The apparatus according to claim 1, wherein the control means comprises a counterweight being of sufficient mass to bias the swing arm toward being bridged between the retainer means, the counterweight also being of sufficient mass to allow the weight of the disk to force the swing arm downwardly.

7. The apparatus of claim 1, wherein the control means comprises releasable connector means connectable to the swing arm for stabilizing the swing arm when the swing arm receives an impact from a disk falling through the inlet.

8. The apparatus of claim 7, wherein the releasable connector means comprises an electromagnet.

9. The apparatus of claim 1, and further comprising a pair of disk duplicating machines, each of the machines having disk-accept and disk-discharge means, the inlet of the apparatus being connectable adjacent the disk-discharge means of one of the machines and the outlet of the apparatus being connectable adjacent the disk-accept means of the other machine.

10. The apparatus of claim 1, wherein each of the retainer means is wall-like.

11. The apparatus of claim 1, wherein the swing arm includes an elongate strip having a low coefficient of friction for engaging the disk.

12. The apparatus of claim 1, wherein the swing arm is plate-like to extend at least halfway between the first and second retainer means.

13. The apparatus of claim 1, wherein the disk is a computer disk.

14. The apparatus of claim 13, wherein the disk is a 3½ inch diameter diskette.

* * * * *